Patented Mar. 18, 1941

2,234,984

UNITED STATES PATENT OFFICE 2,234,984

ALKYLATION PROCESS

Alexander N. Sachanen and Selby B. Davis, Woodbury, N. J., assignors to Socony-Vacuum Oil Company, Incorporated, New York, N. Y., a corporation of New York No Drawing. Application September 23, 1938, Serial No. 231,340

5 Claims. (Cl. 260—671)

This invention relates to the production of alkyl aromatic compounds. More particularly, the invention is concerned with the production of alkaylated aromatic compounds from aromatic compounds and paraffins.

Heretofore, it has been proposed to alkylate aromatic compounds by various methods. These prior processes have mainly involved reacting aromatic compounds and olefines. However, it has also been proposed to alkylate aromatic compounds with paraffins. For instance, U. S. Patent No. 2,098,045 to Vladimir Ipatieff et al. discloses a process wherein the aromatics and paraffins are reacted at a temperature of from 700° to 900° F. in the presence of phosphoric acid as a catalyst. Moreover, it has also been proposed to alkylate aromatic compounds with paraffins at relatively low temperatures of the order of 250° F. or lower in the presence of aluminum chloride or zirconium chloride as catalyst.

These proposed prior processes for the alkylation of aromatic compounds with paraffins are subject to certain inherent disadvantages. Thus, in the process carried out at temperatures of 700° to 900° F. in the presence of phosphoric acid as a catalyst, the rate of alkylation is inordinately slow, requiring about twenty hours at the temperature of 832° F., and it would appear that when using phosphoric acid as a catalyst, the use of temperatures higher than the 900° F. upper limit specified should not be resorted to because of the probability of many undesired side reactions taking place. With regard to the processes carried out at relatively low temperatures in the presence of such catalysts as aluminum chloride or zirconium chloride, one of the main disadvantages is that the consumption of catalyst is relatively high. The amount of catalyst necessary for these low temperature reactions is comparatively high and the consumption of catalyst may be prohibitive from a commercial standpoint when taking into consideration that the spent catalyst of this type cannot be practically recovered.

It is an object of this invention to provide a highly efficient process for alkylating aromatic compounds with paraffins.

Another object of this invention is to provide a highly efficient process for alkylating aromatic compounds with paraffins which may be carried out in a relatively short period of time with small consumption of catalytic material.

According to our invention, the alkylation of the aromatic compounds with paraffins is carried out at high temperatures which are upwards of about 850° F. and in the presence of neutral porous catalyst possessing large catalytic surfaces. We have found that in operating under the above conditions, not only is the rate of alkylation greatly enhanced without promoting to any considerable extent possible side reactions or decomposition, condensation, and the like, which produce coke and tarry substances of high molecular weight, but also that the catalysts used are capable of being regenerated in a simple and economical manner and are of a neutral character which has no deleterious effect on the apparatus used.

The catalysts with which this invention is concerned are those which are commonly known as the clay type. In addition to the various clays themselves and the various activated clays, there are numerous other porous refractory adsorptive materials of similar nature which may be used and come under the common designation of clay-type catalysts, for example fuller's earth, pumice and granular diatomaceous earth. Furthermore, it is to be understood that these various clay-type catalysts which have other suitable catalytic materials impregnated therein or thereon or otherwise conjoined for service may be used.

Since the alkylation reaction together with the attendant cracking reactions which are present at the temperature herein disclosed, bring about a gradual poisoning or deterioration of the catalyst by the imposing of carbon and carbonaceous impurities thereon, it is well to use a clay and other above mentioned similar adsorptive materials which are possessed of sufficient refractory nature so that they may be regenerated in situ by burning. In fact some of the clay catalysts used by us have been regenerated a great number of times and are still quite satisfactory. Because of the ease with which the clay type catalyst may be regenerated, they afford a substantial advantage in their use. It is also well to use clay particles of such physical nature with respect to size and dimension that they may be effectively packed together in a catalytic mass and yet, at the same time, present a sufficient cross-sectional area of flow that the reactants may have a ready passage therethrough as well as a suitable exposure of catalytic material to reactants. A convenient and efficient form for the catalyst is small granules, rods or cylinders.

The use of clay type catalyst has many distinct advantages in addition to those already named. For instance, the clay is not corrosive to the normal apparatus as are many alkylation catalysts and, furthermore, there is no consumption of the catalyst during operation.

The paraffins employed in our process may be gaseous or liquid, or mixtures of these with other hydrocarbons. A very convenient source of paraffin hydrocarbons may be supplied by the use of refinery or natural gases or paraffinic gasolines. In the same manner, as is well known, the aromatic compounds use for alkylation may be employed in a relatively pure form or they may be supplied by the use of products which are known to contain a substantial portion of these aromatic ingredients.

The temperatures employed in our process should be upwards of about 850° F. It is desirable to maintain the temperatures between about 850° F. and about 1000° F. However, it is to be understood that temperatures above 1000° F. may be employed and especially when the process is carried out in a continuous manner. In the preferred process the temperature is maintained at about 900° F. for batch operation and at temperatures not less than about 1000° F. for continuous operation.

The pressures employed in our process may be relatively low, as, for example, around atmospheric pressure, or may be made comparatively high, as, for example, 100 atmospheres or more, if it is desired to increase the rate of alkylation. Thus the rate of alkylation may be easily controlled by regulating the temperature, pressure and the relative amount of catalyst.

Under the temperature and catalytic conditions of our process, it appears that the paraffins are decomposed with formation of an olefine and a paraffin of lower molecular weight. The olefines formed are capable of alkylating benzene since the free energy of alkylation of benzene with olefines is negative at these temperatures even under low pressures. On the other hand, the free energy of polymerization of olefines is positive at the above temperatures under low pressures and much less negative than that of the alkylation of benzene, even if the pressure is high as, for instance, around 1000 pounds per square inch or higher. Accordingly, not only is the desired alkylation reaction the predominate reaction under the conditions of our process as contrasted to undesired polymerization reactions, etc., but also relatively low molecular weight or boiling point alkyl aromatic compounds are formed as a final product.

While alkylated aromatics may be used for many purposes, one of the more important uses is that of blending material for motor fuels, due to the anti-knock qualities of the alkylated aromatics. This use of alkylated aromatic compounds is especially important for motor fuels of high compression type engines, as, for example, the engines designed for use in aviation. As is obvious, the alkylated benzenes must be of the gasoline boiling range in order to be blended with the motor fuels. For this reason, the present process is of particular importance because of the high yield which may be obtained of low boiling alkylated aromatic compounds which are within the gasoline boiling range.

The process may be carried out either as a batch operation or may be made continuous, as for instance, by employing a pipe still and reaction chamber.

The following examples are given in order to more clearly illustrate the invention. However, it is to be understood that the examples are not to restrict the invention in any manner, as there may be wide variations therefrom without departing from the spirit of the invention:

*Example I.*—371 parts by volume of benzene and 159 parts by volume of pentane are reacted in the presence of about 15% (based on the combined weight of the benzene and pentane) of clay catalyst at 890° F. for a period of 90 minutes. The final pressure at this temperature was 1700 pounds per square inch. The liquid product obtained is distilled and gives the following fractions:

Low boiling ends_____parts by vol__ 40
Benzene recovered_____do____ 297
Alkyl benzenes (220°–320° F.)
    parts sp. gr. 0.867, Iodine No. 4__ 48
Alkyl benzenes (320°–410° F.)
    parts sp. gr. 0.889, Iodine No. 14__ 13
Residuum_____parts by volume__ 20

*Example II.*—1640 parts by volume of benzene and 700 parts by volume of pentane are reacted in the presence of about 10.6% (based on the combined weight of benzene and pentane) of clay catalyst at 890° F. for a period of 45 minutes. The final pressure at this temperature was 1650 pounds per square inch. The liquid product obtained is distilled and gives the following fractions:

Low boiling ends_____parts by volume__ 333
Benzene recovered_____do____ 1465
Alkyl benzenes (220°–330° F.)
    parts sp. gr. 0.864, Iodine No. 4__ 166
Alkyl benzenes (330°–410° F.)__parts sp. gr. 0.87__ 36
Residuum_____parts by volume__ 59

From a consideration of the above examples it will be seen that the alkylation of aromatic compounds with paraffin may be carried out in a very short time by our process, whereas prior processes may require as much as 20 hours or more to carry out the alkylation. Moreover it should be understood that the above time of reaction, 45–90 minutes, may be considerably reduced in the continuous process at higher temperatures. At 1000° F., for instance, it does not exceed 2 minutes.

We claim:

1. The process of preparing alkylated aromatic compounds which comprises adding aromatic hydrocarbons to paraffinic hydrocarbons to form a mixture thereof, treating the mixture in the presence of a catalyst comprising an association of silicon oxide and aluminum oxide at a temperature upwards of about 850° F. so that said aromatics will be alkylated with said paraffins, and using a sufficiently high concentration of aromatics and paraffins in said mixture that a substantial amount of said alkylation is obtained.

2. The process of preparing alkylated aromatic compounds which comprises adding aromatic hydrocarbons to paraffinic hydrocarbons to form a mixture thereof, treating the mixture in the presence of a clay catalyst at a temperature upwards of about 850° F. so that said aromatics will be alkylated with said paraffins, and using a sufficiently high concentration of aromatics and paraffins that a substantial amount of said alkylation is obtained.

3. The process of preparing alkyl benzenes of gasoline boiling range by alkylating suitable aromatic hydrocarbons with suitable paraffinic hydrocarbons which comprises adding said aromatic hydrocarbons to said paraffinic hydrocarbons to form a mixture of essentially only said hydrocarbons and treating said mixture in the presence of a clay catalyst at a temperature upwards of about 850° F.

4. The process of preparing alkyl benzenes of gasoline boiling range which comprises adding suitable aromatic hydrocarbons to suitable paraffinic hydrocarbons to form a mixture thereof, treating the mixture in the presence of an activated clay catalyst under superatmospheric pressure at a temperature between about 850° F. and about 1000° F. so that said aromatics will be alkylated with said paraffins, and using a sufficiently high concentration of aromatics and paraffins that a substantial amount of said alkylation is obtained.

5. The process of preparing alkyl benzenes by alkylating aromatics with paraffins which comprises adding benzene to paraffinic hydrocarbons to form a mixture thereof substantially free of olefines, and then treating the mixture in the presence of a clay catalyst under a pressure upwards of about 100 atmospheres at a temperature upwards of about 850° F.

ALEXANDER N. SACHANEN.
SELBY B. DAVIS.